Nov. 14, 1939.　　　　F. N. JACOB　　　　2,180,208

MACHINE FOR BANK-WINDING ELECTRICAL COILS

Filed Feb. 3, 1936　　　6 Sheets-Sheet 1

INVENTOR.
FREDERICK N. JACOB
BY
Clemens H. Vig,
ATTORNEY.

Nov. 14, 1939.        F. N. JACOB        2,180,208
MACHINE FOR BANK-WINDING ELECTRICAL COILS
Filed Feb. 3, 1936        6 Sheets-Sheet 5

INVENTOR.
FREDERICK N. JACOB
BY Clemens H. Vig,
ATTORNEY.

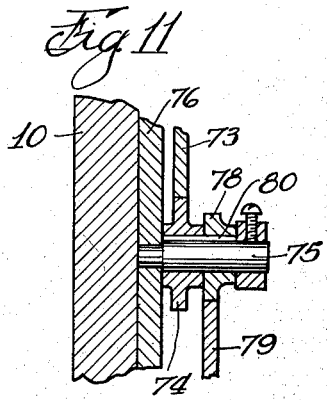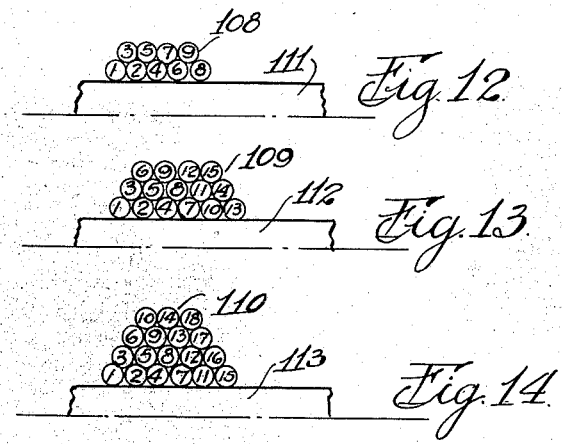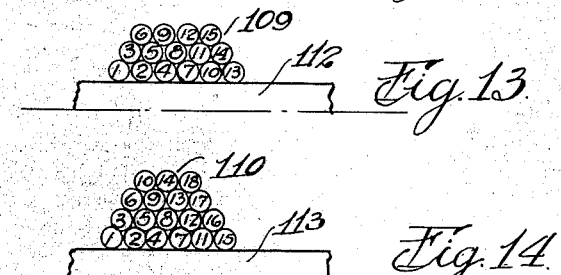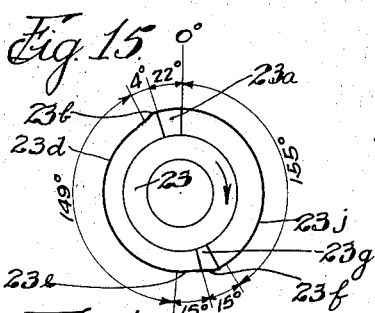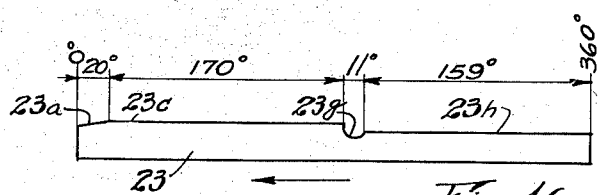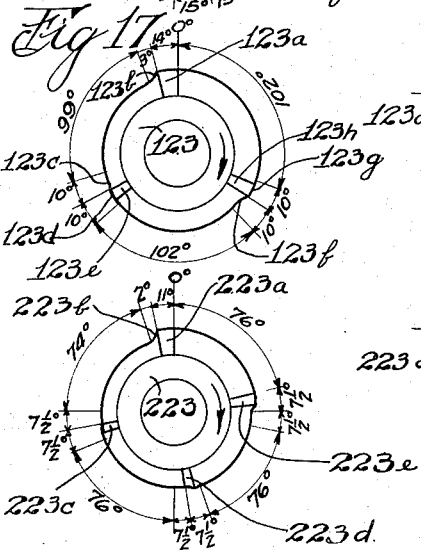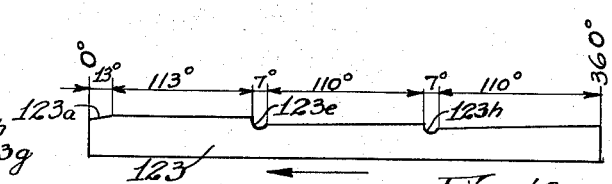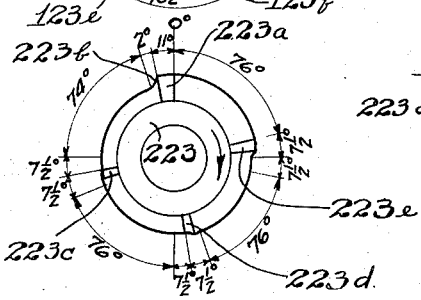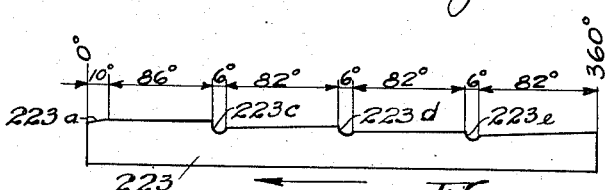

Patented Nov. 14, 1939

2,180,208

UNITED STATES PATENT OFFICE 2,180,208

MACHINE FOR BANK-WINDING ELECTRICAL COILS

Frederick N. Jacob, Chicago, Ill., assignor to Johnson Laboratories, Inc., Chicago, Ill., a corporation of Illinois Application February 3, 1936, Serial No. 62,032

15 Claims. (Cl. 242—9)

My invention consists of a machine for winding electrical coils of different types, such as bank-wound coils and solenoid coils, and is characterized by cam mechanism directly controlling the guiding of the winding wire to the coil being wound, in such a manner as to produce the desired type of bank-wound coil, or, if desired, coils of other kinds may be wound without the use of said cam mechanism.

In winding bank-wound coils, said cam mechanism imparts movement laterally and vertically to the device guiding the winding wire to the coil being wound, and so controls the making of the cross-overs between successive banks of the coil, as well as the proper laying of the turns of each bank in winding the coil.

My invention will be best understood by reference to the accompanying drawings, illustrating the above and other objects thereof, in which—

Fig. 7 is a horizontal, sectional view of a part of the construction shown in Fig. 6, taken along the line 7—7;

Fig. 8 is a vertical, sectional view of a part of the construction shown in Fig. 6, taken along the line 8—8;

Fig. 9 is a vertical, sectional view of a part of the construction shown in Fig. 6, taken along the line 9—9;

Fig. 10 is a vertical, sectional view of a part of the construction shown in Fig. 6, taken along the line 10—10;

Fig. 11 is a vertical, sectional view of a part of the construction shown in Fig. 5, taken along the line 11—11;

Figs. 12, 13 and 14 are diagrammatic and longitudinal, sectional views of bank-wound coils of the two-bank, three-bank and four-bank type respectively, only that part of the coil above its center line, being shown in each of these figures;

Fig. 15 shows in end elevation, the type of cam used in winding coils of the two-bank type;

Fig. 16 is a developed view of the outer cylindrical surface of the cam shown in Fig. 15, to show the form of the end cam surface of said cam;

Fig. 17 shows in a view similar to Fig. 15, the type of cam used in winding coils of the three-bank type;

Fig. 18 shows in a view similar to Fig. 16, a developed view of the cam shown in Fig. 17;

Fig. 19 shows in a view similar to Fig. 15, the type of cam used in winding coils of the four-bank type;

Fig. 20 shows in a view similar to Fig. 16, a developed view of the cam shown in Fig. 19;

Fig. 21 is a view to an enlarged scale, of the wire guiding device shown in Fig. 1, taken along the line 21—21;

Fig. 22 is a sectional view of the parts shown in Fig. 21, taken along the line 22—22;

Fig. 23 is a view of part of the structure shown in Fig. 21, taken along the line 23—23;

Fig. 24 is a view of part of the structure shown in Fig. 21, taken along the line 24—24, and Fig. 25 is a sectional view of part of the structure shown in Fig. 22, taken along the line 25—25.

Similar numerals refer to similar parts throughout the several views.

Figure 1:
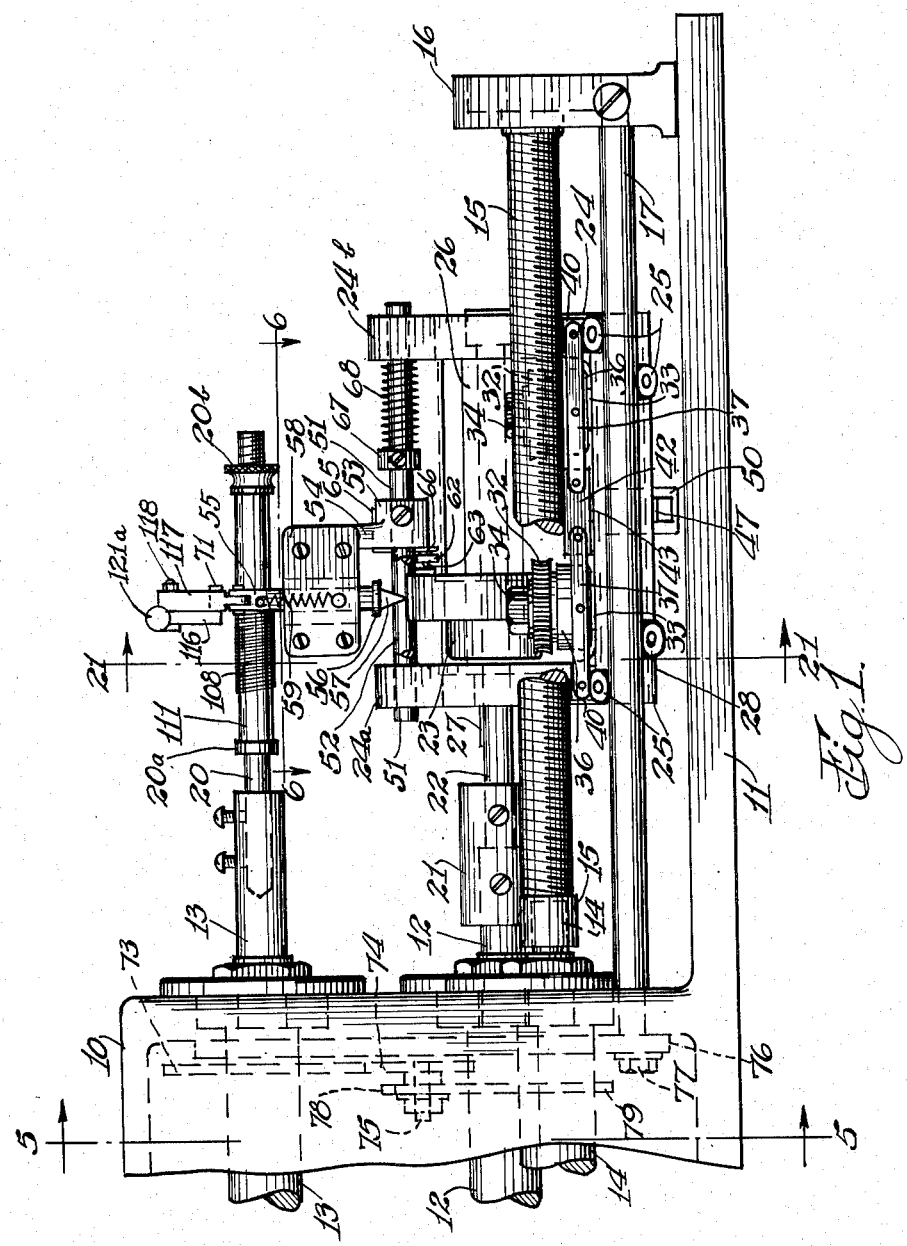
Fig. 1 shows the winding mechanism of my machine in front elevation, as well as part of the housing containing the driving mechanism of the machine.
Figure 2:
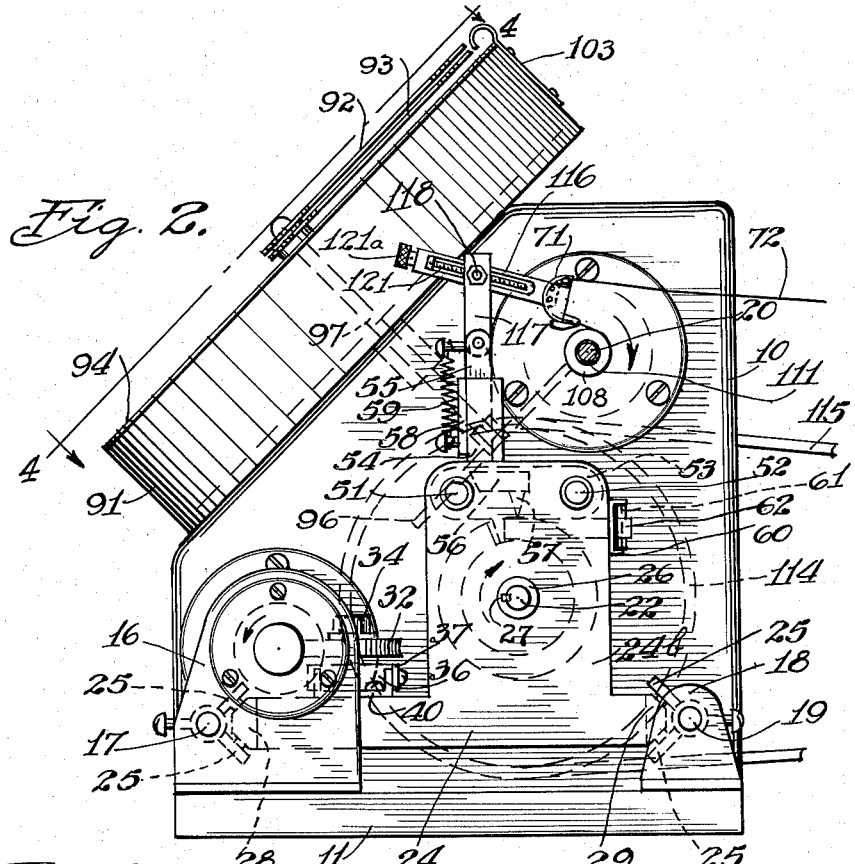
Fig. 2 is a right hand end elevation of the parts shown in Fig. 1.

As shown in Fig. 1, my winding machine consists of a housing 10 from the lower part of which a base 11 extends, which housing supports in suitable bearings a cam shaft 12, a winding shaft 13 and a feed shaft 14, said shafts being horizontal and substantially parallel with each other, and extending through the right hand end of the housing 10, as shown in Fig. 1. The end of the shaft 14 is secured to and carries, one end of a feed screw 15, the other end of which is mounted for rotation in a bracket 16 carried by the base 11, which bracket also supports one end of a guide rod 17 the other end of which is supported by the housing 10, said guide rod being substantially parallel with the feed screw 15. As shown in Fig. 2, the base 11 also carries a second bracket 18 supporting one end of a second guide rod 19 above the back portion of the base 11, the other end of which guide rod is supported by the housing 10 in the manner shown in Fig. 1 for the guide rod 17, said guide rods being substantially in the same horizontal plane and parallel with each other.

As shown in Fig. 1, the winding shaft 13 has extending therefrom over the base 11, a winding spindle 20 to support the coils wound by the machine, said spindle being secured to said shaft 13. In Fig. 1, I show the spindle 20 as provided with a flange 20a against which a tubular core 111 may be held by a thumb nut 20b threaded on the outer end of said spindle, during the winding on said core of a coil 108. The cam shaft 12 carries by means of a coupling 21, an extension shaft 22 for driving the winding cam 23 of the machine.

Figures 5, 6:
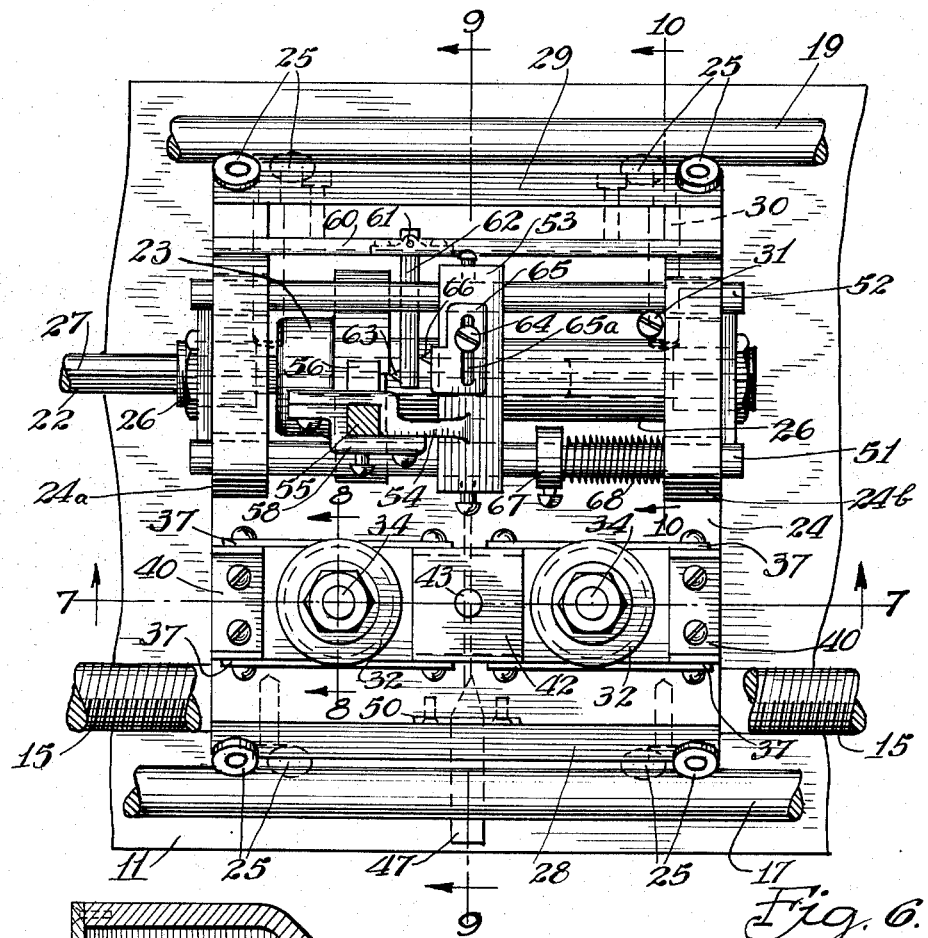
Fig. 5 is a vertical, sectional view of the parts shown in Fig. 1, taken along the line 5—5.
Fig. 6 is a horizontal, sectional view to an enlarged scale, of a part of the construction shown in Fig. 1, taken along the line 6—6.

The guide rods 17 and 19, as shown in Figs. 1, 2 and 6, support a carriage 24 by means of rollers 25, so that said carriage may move freely longitudinally of said guide rods by the action of the feed screw 15, and also independently of said feed screw, when the carriage is released from feeding engagement with said feed screw.

As shown in Figs. 1, 2 and 6, the carriage 24 is provided with upwardly extending end walls 24a and 24b, which carry bearings supporting a tubular shaft 26 coaxially with the extension shaft 22 which is a sliding fit in said tubular shaft, but prevented from turning therein by a feather key 27. The cam 23 is mounted upon and rigidly secured to the tubular shaft 26 and said shaft is prevented from end-wise movement relatively to the carriage 24, by the bearings supporting it.

As shown in Figs. 2 and 6, the rollers 25 are mounted on bars 28 and 29 secured respectively to the front and rear edges of the carriage 24, the bar 28 being rigidly secured to said carriage, for example, by screws, whereas the bar 29, as more clearly illustrated in Fig. 10, is provided with rods 30 extending with sliding fits into bores therefor in the carriage 24, each of which rods 30 engages at its inner end, the conical end of an adjusting screw 31, so that wear of the rollers 25 and of the guide rods 17 and 19, may be compensated for by means of said adjusting screws.

The feed screw 15 is engaged by two worm wheels 32 carried by the carriage and each secured thereto as shown for one of of said worm wheels in Fig. 8, in which the wheel is shown as mounted for rotation on a shouldered sleeve 33, said wheel being held on said sleeve by a bolt 34 and washer 35 which hold the sleeve against movement relatively to the carriage 24 at all times. The wheel has extending downwardly therefrom and as a part thereof, one member 32a of a cone clutch, the cooperating member 36 of which is normally held in engagement with the member 32a, by links 37 pivotally connected with said member 36 at 38. As more clearly shown in Fig. 7, the outer ends of the links 37 are pivotally connected at 39, with brackets 40 secured to the carriage 24, the other ends of said links being pivotally connected at 41 with a channel member 42 secured to the upper end of a releasing rod 43 extending downwardly with a sliding fit through a bore therefor in the carriage 24. A counterbore 44 is provided in the upper surface of the carriage 24 around the rod 43, to contain the lower portion of a compression spring 45, the upper end of which presses against the lower surface of the member 42, as a result of which, when there is no downward force exerted on the rod 43, the spring 45 moves the member 42 and the inner ends of the links 37 as far upwardly as the engagement of the clutch members 32a and 36 will permit, in which position the spring 45 tightly holds said clutch members, and since the connection described between the links 37, the clutch members 36 and the brackets 40, prevents rotation of the clutch members 36, rotation of the worm wheels 32 is also prevented, and the worm wheels act as nuts on the feed screw 15 with which said worm wheels are always in mesh, and the carriage 24 is moved longitudinally of the rods 17 and 19 at a rate determined by the pitch and rate of rotation of the feed screw. As more clearly shown in Fig. 9, the lower end of the rod 43 is pivotally connected at 46 with a mid-portion of a lever 47 which is pivotally supported at its inner end at 48, on a stud 49 extending downwardly from the carriage 24. The outer end of the lever 47 extends through a guide plate 50 carried by the front portion of the carriage 24, and below and in front of the guide rod 17, where its free end is available for movement by the operator of the machine. When for any reason it is desired to move the carriage 24 on the rods 17 and 19, independently of the feed screw 15, the outer end of the lever 47 is depressed against the action of the spring 45, thus depressing the clutch members 36 from engagement with the clutch members 32a for which condition of the parts, the carriage 24 may be moved freely longitudinally of the rods 17 and 19, since the worm wheels 32 are now free to turn on the sleeves 33. When the carriage 24 is so moved to the position desired, for example, to begin the winding of a coil, the lever 47 is released, and the spring 45 again moves the clutch members tightly into engagement with each other. In this way, I provide a releasable feeding connection between the carriage and the feed screw which may be instantly released or engaged as desired, for any position of the carriage and feed screw, which is not dependent on the limitations involved in separating a nut from or engaging the same with a feed screw, since in my construction the nut members are always in mesh with the feed screw, and the number of possible positions of the nut members or wheels 32, relatively to the feed screw 15 is infinite, in any one of which the nut members may be tightly held by the clutch members described. It will also be observed that the member 42 on which the spring 45 acts, by its pivotal connection with the inner ends of the links 37, serves as an equalizer to effectively communicate the force of said spring to both of the clutch members 36, to tightly hold them in engagement with the clutch members 32a. This not only provides a double clutch mechanism either part of which effectively prevents longitudinal movement of the carriage relatively to the threads of the feed screw 15, but also insures the effective operation of each of said clutch mechanisms for inequalities thereof due to wear or other causes.

As shown in Figs. 1, 2 and 6 the end walls 24a and 24b of the carriage 24, support parallel horizontal rods 51 and 52 in bushings in which they are sliding fits, said rods being substantially parallel with and above the tubular shaft 26. The rods 51 and 52 carry a yoke 53 which is secured to them, said yoke being provided with an upwardly extending bracket 54 which also extends laterally over the cam 23 to form a vertical guideway for a flat sided bar 55 carrying at its lower end a plate 56 from which a follower point 57 of hard material, for example, hardened steel, projects downwardly to rest upon the circumferential or side cam surface of the cam 23. The bar 55 is held in place by a plate 58 secured to the bracket 54 to complete the guideway for the bar 55, and a spring 59 is connected at its ends with the upper portion of the bar 55 and with the plate 58, to hold the follower point 57 in engagement with the cam 23.

As more clearly shown in Fig. 6, the end walls 24a and 24b support on their rear edges, a horizontal channel bar 60 pivotally supporting at 61, a lever 62 which extends forwardly and substantially parallel with the end of the cam 23, and carries a follower point 63 of hard material, for example, hardened steel, resting on the upper portion of the end cam surface of the cam 23. The yoke 53 has secured thereto by a screw 64, an angle member 65 having a depending portion carrying a fulcrum 66 for engagement with the surface of the lever 62 away from the follower point 63, said angle member having a slot 65a in its upper portion to receive the screw 64, whereby by loosening said screw, said fulcrum 66 may be moved longitudinally of the lever 62 to impart any desired part of the end cam action of the cam 23, to the yoke 53. One of the rods 51 and 52, for example, the rod 51, carries a collar 67 between which and the end wall 24b, said rod carries a compression spring 68 which, acting on the collar 67, tends to move the yoke 53 to the left and thus holds the fulcrum 66 against the lever 62, which in turn holds the follower point 63 against the end cam surface of the cam 23. The pressure of the follower point 63 against the cam 23, may be varied as desired, by adjustment of the collar 67 on the rod 51.

As more clearly shown in Fig. 2, the upper end of the bar 55 has adjustably secured thereto, as described below, in connection with Figs. 21 to 25 inclusive, a wire guiding device 71, for guiding the wire 72 to the coil being wound on the spindle 20. The support of the wire guiding device 71 is thus moved vertically by radial variations in the same cam surface of the cam 23, and is also moved towards and from the ends of the carriage 24 by variations in the end cam surface of said cam, the support of said device 71 otherwise having no movement relatively to the carriage 24 during the winding of a coil.

As shown in Fig. 5, the winding shaft 13 has rigidly secured to it adjacent the right hand end wall of the housing 10 as seen in Fig. 1, and inside of said housing, a gear 73 meshing with a gear 74 mounted on a stud 75 carried by an arm 76 mounted for swinging movement around the axis of the shaft 13 and having at its lower end a slotted off-set portion to receive a clamping screw 77 extending into the housing 10, to hold the arm 76 in any desired adjustment. The stud 75 has also mounted thereon a pinion 78 meshing with a gear 79 rigidly secured to the cam shaft 12. As more clearly shown in Fig. 11, the gear 74 and the pinion 78 are connected for simultaneous rotation on the stud 75, by a feather key 80 which is a sliding fit in said gear and said pinion, so that pinions of other sizes may be substituted as desired for the pinion 78, to secure different desired gear ratios between the shafts 12 and 13. The gearing just described effects rotation of the winding shaft 13 from the cam shaft 12.

Figure 3:
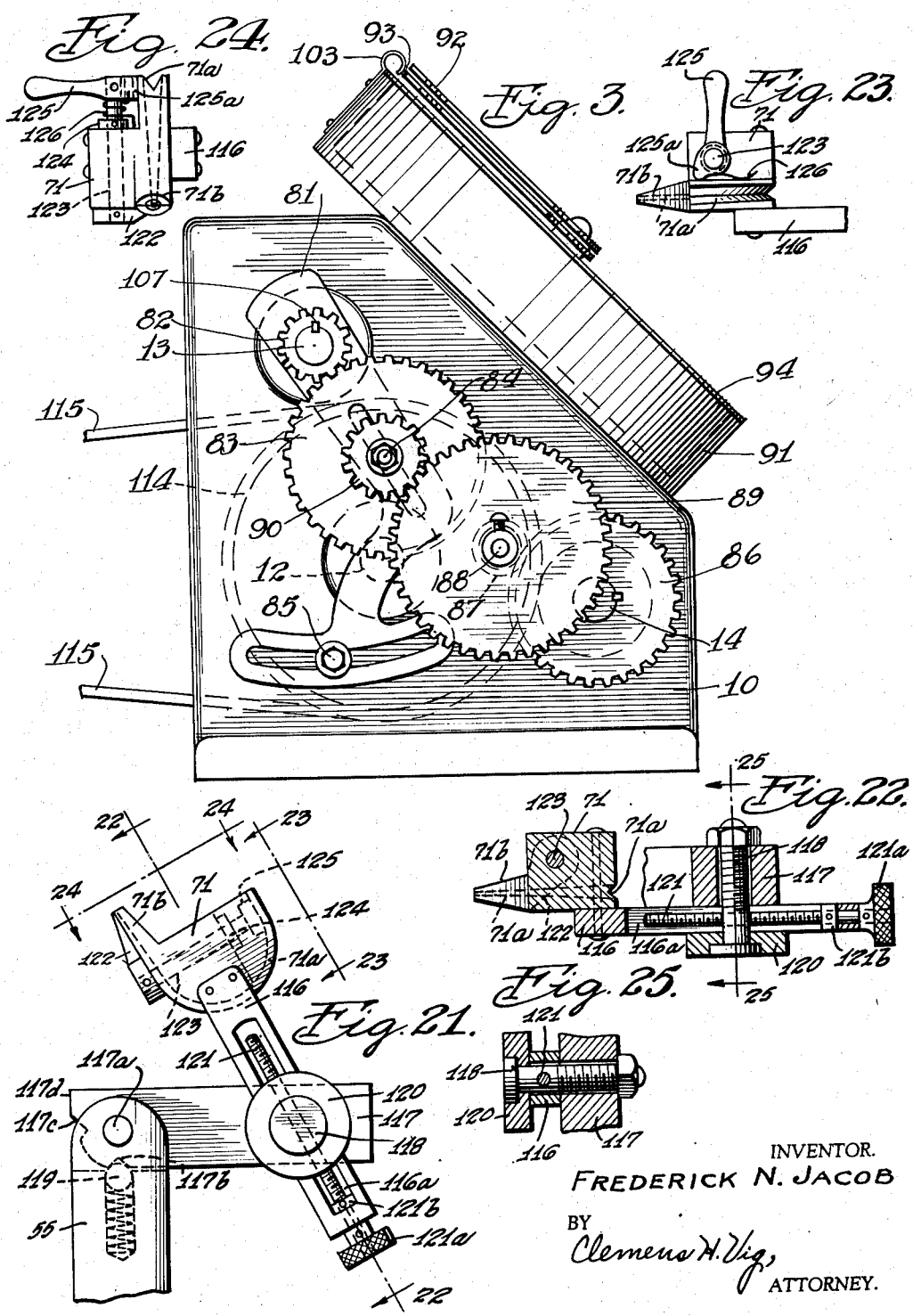
Fig. 3 is a left hand end elevation of the housing of my machine.

As shown in Fig. 3, an arm 81 is mounted on the outer face of the left hand end wall of the housing 10, for angular movement about the winding shaft 13, which shaft has secured thereto by a feather key 107, a pinion 82 meshing with a gear 83 mounted for rotation on a stud 84 carried by the arm 81. Said arm is slotted at its mid portion to receive the stud 84, so that different sizes of pinions 82 and gears 83 may be used as desired. The lower portion of the arm 81 is provided with a slotted offset portion to receive a clamping screw 85 extending into the housing 10, by which the arm may be securely held in any desired adjustment. The feed shaft 14 has secured thereto by a feather key, a gear 86 meshing with a pinion 87 mounted for rotation on a stud 88 carried by the housing 10, on which stud a gear 89 is also mounted and connected with the pinion 87 for rotation therewith. The gear 89 meshes with a gear 90 mounted on the stud 84 and connected with the gear 83 for rotation therewith. The gears 83 and 90 are preferably connected by a feather key, as are also the pinion 87 and the gear 89, providing for the ready assembling and proper intermeshing of any desired sizes of gears, and the driving of the feed shaft 14 at any desired speed relatively to the speed of the winding shaft 13.

Figure 4:
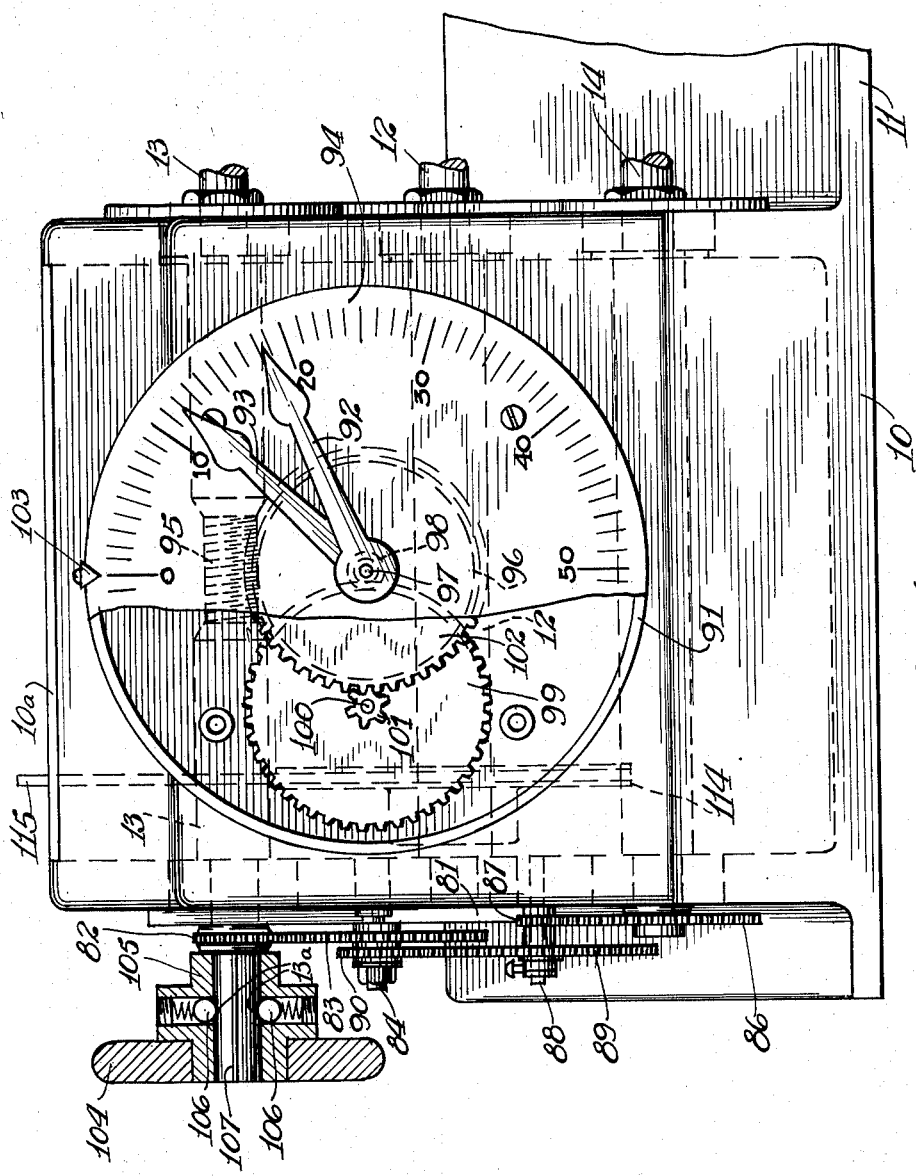
Fig. 4 is a plan view of the turn indicating mechanism of my machine, this view being taken along the line 4—4 in Fig. 2.

As shown in Fig. 4, the housing 10 carries a counter casing 91 containing gearing driving the "units" and "hundreds" pointers 92 and 93 for indicating by means of the dial 94, the number of hundreds of rotations of the winding shaft by the pointer 93 and the number of rotations of said shaft less than one hundred by the pointer 92, at any instant during a winding operation. The shaft 13 is provided with a worm screw 95 at its mid-portion, meshing with a worm wheel 96 carried by the inner end of the counter spindle 97 which carries at its outer end the pointer 92, the number of teeth on the worm wheel 96 being such that each rotation of the shaft 13, advances the pointer 92 one division of the dial 94. The spindle 97 has secured thereto a pinion 98 meshing with a gear 99 mounted for rotation on a stud 100, on which stud a pinion 101 is also mounted and secured to the gear 99, said pinion 101 meshing with a gear 102 mounted for rotation coaxially with and independently of the spindle 97, said gear having connection with the pointer 93 to rotate the same. The connection between the pointers 92 and 93 and the spindle 97 and the gear 102 respectively, is frictional, permitting the pointers to be readily moved manually to their zero position on the dial, represented by the fixed indicator 103, at the beginning of each winding operation.

As shown in Fig. 4, the winding shaft 13 extends beyond the pinion 82, to receive a hand wheel 104, having a hub 105 provided with ball clutches 106 for engaging indentations 13a in the shaft 13 to hold the hand wheel in place on the shaft, and yet permitting its instant removal when desired, for example, to effect changes in the gear train connecting the shaft 13 with the shaft 14. Rotation of the hand wheel 104 on the shaft 13 is prevented by the feather key 107 which also engages the pinion 82.

In Figs. 12, 13 and 14, I illustrate diagrammatically three types of bank-wound coils 108, 109 and 110, that may be wound by my machine, said coils being respectively of the two-bank, the three-bank and the four-bank type. These coils are shown in longitudinal, sectional view, and in each case only the part of the coil above its center line is shown, to illustrate the sequence of the several turns of the coil to each other. The coils are shown as wound on cores 111, 112 and 113 respectively.

In the two-bank coil 108, the first turn of each bank is on the core 111, as shown by the turns marked 2, 4, 6, 8, and the second turn of the same bank is above and back of the first turn, between said first turn and the inner turn next preceding it, as shown by the turns marked 3, 5, 7 and 9 respectively. When, for example, turn 2 is nearly completed, the winding wire must be raised to climb over turn 2 and it must at the same time be moved backward of the coil into alignment with the groove between turns 1 and 2 to begin turn 3; when turn 3 is nearly completed and the cross-over to the beginning of turn 3 is approached, the winding wire must be moved forwardly of the coil to cross over turn 2, and then down adjacent turn 2 to begin turn 4, which cycle is repeated until a desired length of coil is wound.

The cam 23 illustrated in Figs. 15 and 16, moves the winding wire 72 relatively to the carriage 24, to effect the two-bank winding cycle described. The position marked 0° is the beginning of a cross-over from the end of the second turn of the next preceding bank, to the first turn, for example, 2, 4, 6 or 8, of the bank about to be wound; at first, for about 20°, the end surface 23a of the cam, moves the wire guiding device 71 forwardly of the coil an amount equal to one and one-half times the diameter of the wire; then the depression 23b in the side surface of the cam, drops the device 71 and the winding wire from the outer layer to the inner layer of the coil; this position of the device 71 is maintained by the surfaces 23c and 23d of the cam, for one complete turn of the wire on the core 111 to complete the first turn of the bank; then, the side cam surfaces 23e and 23f having raised the device 71 and the winding wire a little above the outer layer of the coil, the end depression 23g of the cam permits movement of the device 71 back over the coil to make the cross-over from the first to the second turn of the cycle, and to bring the winding wire into alignment to wind said second turn, in which position the device 71 is held relatively to the carriage 24 by the surfaces 23h and 23j of the cam, until one rotation of the cam is completed, and the device 71 is in the same position relatively to the carriage 24, that it occupied at the beginning of the cycle described. During this time, however, the feed screw 15 has been moving the carriage 24 forwardly, the ratios of the gearing shown in Figs. 3 and 5 being such that for each rotation of the cam 23, the winding shaft 13 makes a little more than two rotations, and that for each two rotations of the winding shaft 13, the combined effect of rotation of the feed shaft 14 and the pitch of the thread of the feed screw 15, moves the carriage forwardly relatively to the coil, an amount equal to the diameter of the winding wire. At the end of the first winding cycle, the device 71 is thus in position relatively to the coil, to begin the second winding cycle, and the operation described is continued until the desired length of coil is wound.

In winding the three-bank coil 109 illustrated in Fig. 13, similar operations are required, excepting that in this case three turns of the coil are required to complete the winding cycle. In this case, as before, at the beginning of a winding cycle, the winding wire must be moved forwardly of the coil and down to the core 112 to begin the innermost turn 4, 7, 10 or 13 as the case may be; just before the end of said first or innermost turn, the winding wire must be raised and moved back relatively of the coil to go over the cross-over and be in position to wind the second turn 5, 8, 11 or 14, as the case may be, just before the end of which turn, the winding wire must again be raised and moved back over the coil to again go over said cross-over and be in position to wind the third turn 6, 9, 12 or 15 of the cycle, as the case may be, at the end of which turn the next cross-over is made to the core 112 to begin the next cycle.

The cam 123 illustrated in Figs. 17 and 18 is constructed to replace the cam 23, to effect the winding of a three turn cycle or three-bank coil, as follows: The end surface 123a and the side surface 123b effect the cross-over to the core at the beginning of each cycle; the side surfaces 123c and 123d and the end depression 123e effect the movement of the device 71 and the winding wire over the cross-over and up and back to the position to wind the second turn of the cycle; and the side surfaces 123f and 123g and the end depression 123h move the device 71 and the winding wire over the cross-over, and up and back to the position to begin the third turn of the cycle at the end of which the device 71 is in the same position relatively to the carriage 24, that it was at the beginning of the cycle. In this case, the gearing illustrated in Fig. 5 must have a ratio imparting to the winding shaft 13 a little more than three rotations for each rotation of the cam shaft 12, the movement of the carriage effected by the gearing illustrated in Fig. 3 and by the pitch of the feed screw 15, being the same per rotation of the cam shaft 12 as before, assuming that the same diameter of winding wire is used as before.

The winding of the coil 110 shown in Fig. 14, by the use of the cam 223 illustrated in Figs. 19 and 20, instead of using the cam 23, is similar to the winding of the coil 109 by the cam 123, the difference being that there are four turns per cycle and that after the cross-over effected forwardly and down to the core 113 at the beginning of the cycle by the end and side cam surfaces 223a and 223b respectively, three up and back movements of the device 71 and the winding wire, which are spaced from each other, are required to move the wire over the cross-over to begin the second, third and fourth turns respectively of the cycle, which up and back movements are successively effected by the cam end depressions 223c, 223d and 223e respectively, and the associated side cam surfaces of the cam, leaving the device 71 in the same position relatively to the carriage 24 at the end of each cycle, or rotation of the cam 223, that it occupied at the beginning of said cycle or rotation. In this case the ratio of the gearing between the shafts 12 and 13 is such that the winding shaft 13 makes a little more than four rotations for each rotation of the cam shaft 12, the movement of the carriage per rotation of the cam shaft 12 being the same as before, assuming that the same diameter of winding wire is used as before.

The housing 10 is provided with a removable back wall 10a permitting ready access to the interior of the housing, and the cam shaft 12 has secured thereto in the housing, a driving pulley 114 from which a belt 115 extends to any suitable source of power, not shown, to drive the machine.

In stating that the winding shaft 13 makes slightly more than two, three or four rotations per rotation of the cam for the two, three and four-bank types of coils respectively, the following consideration is involved. To avoid bunching and piling up of the cross-over portions of any coil, said cross-overs must not occur successively at the same portion angularly of the coil, and it is preferable in effecting a distribution of said cross-overs around the coil, to begin each cross-over from the completed outer turn of a winding cycle, for example, from thirty to forty-five degrees later than the beginning of the next preceding one of said cross-overs, and yet the cam 23, 123 or 223 as the case may be, must be in its zero-degrees position above referred to, at the beginning of each of said cross-overs. Thus, although the cam makes one complete rotation per winding cycle, the winding spindle 20 and the winding shaft 13 will make two rotations plus from thirty to forty-five degrees, three rotations plus the same amount, or four rotations plus the same amount, as the case may be, per winding cycle.

As shown in Fig. 21, the wire guiding device 71 is rigidly secured to the end of an adjusting bar 116 mounted for reciprocating movement for adjusting purposes on a second bar 117 by a bolt 118. The bar 117 is pivotally secured at one end at 117a, to the upper end of the bar 55, for movement either to its horizontal position shown in Fig. 21 to move the wire guiding device 71 away from the winding spindle 20, for example, to remove a wound coil from said spindle and to place an unwound core 111 on said spindle, or to its vertical position, for which position the wire guiding device is closely adjacent a coil being wound and in position to positively control the movements of the winding wire required in properly laying the turns of the coil in the sequence described. The upper end of the bar 55 is provided with a spring-actuated ball detent 119, for engaging indentations 117b and 117c in the end of the bar 117, to yieldingly hold the bar 117 in its said horizontal and vertical positions respectively, the end of said bar 117 being provided with a shoulder 117d engaging the bar 55 for the vertical position of said bar 117, to limit movement of the latter to its said vertical position. As shown in Fig. 25, the bolt 118 carries a washer 120 resting against the bar 116, so that said bar may be held against the bar 117 with any desired pressure. As shown in Figs. 21 and 22, the bar 116 is provided with a longitudinal slot 116a to receive the bolt 118, so that said bar may be moved longitudinally. A screw 121 is located in the slot 116a and threaded through the bolt 118, which screw extends through the end of the bar 116 and carries on its outer end, a head 121a for turning said screw, a collar 121b being secured to said screw just inside of the end wall of the slot 116a adjacent the head 121a, whereby turning said screw 121 moves the bar 116 longitudinally to any desired adjustment. The delivery end of the wire guiding device 71 may thus be moved accurately to any desired position relatively to a coil being wound, and held in that position. The bar 116 preferably extends obliquely across the bar 117, and downwardly towards the wire guiding device 71 when the bar 117 is in its vertical position, to facilitate leading the winding wire from any suitable supply source, not shown, to the wire guiding device, without interference with the coil being wound.

As shown in Figs. 21 to 24 inclusive, the wire guiding device 71 is rigidly secured to the outer or lower end of the bar 116, and consists of a block of suitable material, for example, metal, having a semi-circular edge conformation adjacent the bar 116, provided in its edge portion with a groove 71a to receive the winding wire at its upper portion, and deliver said wire from its lower portion to the coil being wound.

The groove 71a is at its upper portion, preferably substantially larger than the winding wire, and becomes smaller towards its lower portion where it is of substantially the same size as the wire to accurately guide the wire to the coil. The block constituting the wire guiding device 71, is provided at the delivery end of the groove 71a, with a long, slender nose 71b in the lower face of which the delivery end of the groove 71a is so formed as to entirely contain the winding wire just above the lower flat face of said nose. The wall of the nose 71b at the delivery end of the groove 71a is preferably as thin as mechanical limitations will reasonably permit, so that the end of the nose may be nearly in contact with a coil being wound, to accurately guide the winding wire thereto. As shown in Figs. 21 and 24, a thin cover plate 122 is mounted on the lower flat face of the device 71 and nose 71b, by means of a rod 123 to the lower end of which said plate is secured, said plate having substantially the shape of the nose 71b and being as thin at the delivery end of said nose as mechanical considerations will reasonably permit. The rod 123 extends upwardly through the block of the device 71 and into a recess in the upper portion of said block, in which recess said rod carries a collar 124 holding said plate 122 against the lower flat face of the nose 71b, and a handle 125 for turning said rod 123 and said plate 122 to a position uncovering the delivery end portion of the groove 71a. Between the collar 124 and the handle 125, the rod 123 carries a spring 126, the ends of which engage said handle and the side wall of the recess in said block, to move said plate 122 to its groove covering position, which movement is limited by the engagement of a lug 125a on said handle, with said recess side wall, in which position of the plate 122, its edges are in alignment with the edges of the nose 71b, and the delivery portion of the groove 71a is covered to retain the winding wire in said groove during the coil winding operations. Moving the plate 122 to its groove uncovering position, permits the winding wire to be readily and quickly placed in the groove 71a.

It will be understood that although there is considerable latitude in the amount of up and down movement of the winding wire by the wire guiding device 71, during a winding cycle, the lateral movement of said device 71 during said cycle should be accurately effected as determined by the diameter of the winding wire 72. The adjustable angle member 65 provides a means for accurately securing said desired lateral movement, since by means of it, the fulcrum 66 may be adjusted longitudinally of the lever 62 until exactly the desired amount of lateral movement of the device 71 relatively to the carriage 24, is secured. Again, the member 65 obviates the necessity of having a different cam for each size of winding wire, since different adjustments of said member 65 may be made, giving for the same cam, different amounts of lateral movement of the device 71 relatively to the carriage, which are correct respectively for different sizes of wire.

The operation of my machine is as follows:

A winding cam of the kind illustrated in Figs. 15, 17, or 19, depending on whether a two-layer coil, a three-layer coil or a coil with a larger number of layers is to be wound, is mounted on the tubular shaft 26, and suitable gearing is inserted in the gear train illustrated in Fig. 5 to drive the winding shaft 13 from the cam shaft 12, the ratio being determined by the number of layers to be wound in the bank coil, so that for a two-layer coil the winding shaft will make substantially two rotations per rotation of the cam, or substantially three rotations per rotation of the cam for a three-layer coil, and so on; also the gearing in the gear train illustrated in Fig. 3 is selected so that the feed shaft 14 and feed screw 15 are rotated to move the carriage 24 longitudinally of the supporting rods 17 and 19, an amount equal to the diameter of the wire 72 to be used, for each winding cycle effected by the cam employed.

A tubular core 111 to receive the coil is mounted on the winding spindle 20 and the wire 72 from a suitable supply, not shown, is placed in the wire guide 71 as described, and with the clutch members 36 released by depressing the lever 47, the carriage 24 is moved to bring the wire guide 71 to the position on the winding core to begin the winding of the coil, and the lever 47 is then released so that the clutches of the carriage driving mechanism will be operatively engaged.

Assuming that a two-layer coil is to be wound, rotation of the cam shaft 12 by suitable means, not shown, to wind the first turn of the winding cycle, first operates the wire guide 71 by the cam surface 23a to move the guide forwardly along the core and then the cam surface 23b drops the wire guide into position to direct the wire 72 to the surface of the winding core to wind the first turn of the cycle (1, 2, 4, etc., of Fig. 12); the side and end surfaces of the cam hold the wire guide in proper position for winding the first turn of the cycle on the winding core, and then the surface 23f of the cam raises the guide to the proper level to wind the second layer of the coil and the surface 23g of the cam causes back movement of the guide over the first turn and into position to start the second or bank turn of the cycle (3, 5, 7, etc., of Fig. 12), and the guide 71 is held in proper position by the side and end surfaces of the cam to wind said second turn; then the cam surfaces 23a and 23b again operate the wire guide as before to move it forwardly and down to the surface of the winding core to start the first turn of the second winding cycle (2, 4, 6, etc., of Fig. 12), and the operation is repeated until the requisite number of turns are wound on the core, which may be indicated by the hands or pointers 92 and 93, assuming that they were set at zero at the beginning of the winding operation.

In stating that the gear ratio for a two-layer coil, between the cam shaft 12 and the winding shaft 13, is such as to produce substantially two rotations of the winding shaft for one rotation of the cam shaft, as above described, it is desirable that this relation shall be such that the winding shaft will rotate somewhat more than two rotations for each rotation of the cam shaft, for example, from 30 to 45° more, to stagger the crossover portions of the winding so that they will not bunch up, as they would if they occurred at the same angular position of the coil.

In winding a three-layer coil, the operation is similar excepting that a cam of the type illustrated in Figs. 17 and 18 is employed on the tubular shaft 26, and the gearing illustrated in Fig. 5 is selected to cause a little more than three rotations of the winding shaft for each rotation of the cam shaft. With this arrangement, the cam surfaces 123a and 123b first operate on the wire guide 71 to drop the guide to a position to wind the first turn (1, 2, 4, 7, etc., of Fig. 13) of the cycle on the winding core, the end and side cam surfaces holding the wire guide while this takes place; at the end of the first turn of the cycle the cam surface 123d raises the wire guide to the level of the second layer of the winding and the cam surface 123e causes back movement of the guide over the first turn to start the second turn of the cycle (3, 5, 8, 11 of Fig. 13), during which the end and side surfaces of the cam direct the wire guide to complete the second turn of the cycle; then the cam surface 123f raises the guide 71 and the cam surface 123h causes back movement of the guide to start the third turn (6, 9, 12, 15 of Fig. 13), and the wire guide is directed by the end and side surfaces of the cam to complete the third turn of the cycle; then the cam surfaces 123a and 123b again operate on the wire guide as before to begin the first turn (2, 4, 7 of Fig. 13), of the next winding cycle.

In winding coils having more than three layers, the operation is similar to that described, the only difference being in the cam selected to control the movements of the wire guide 71, and the ratio of the train of gearing illustrated in Fig. 5, it being understood that in any case the cam raises and imparts a backward movement to the wire guide at the end of the winding of each turn of a winding cycle except the last turn thereof, and that at the end of the last turn of each cycle the cam moves the wire guide forwardly and drops it to the level of the winding core to begin the winding of the next cycle.

The feed screw 15 moves the carriage 24 uniformly during each winding cycle an amount substantially equal to the diameter of the wire 72.

While I have described my machine as used to wind two, three and four-bank types of coils, it will be understood that bank wound coils of any desired number of layers or turns per bank may be similarly wound, the only requisite being that the cam employed shall be made to control as described, the winding of all of the turns of any winding cycle, by not to exceed one rotation of the cam. While I prefer to employ one complete rotation of the cam to control the winding of the turns of a single winding cycle or bank, it will be understood that where the number of turns per winding cycle is not large, if desired, a single rotation of the cam may control the winding of all of the turns of two or more successive winding cycles, by correspondingly forming the cam and employing suitable ratios for the gearing above described.

In addition to winding different types of bank-wound coils, my machine is adapted to wind solenoids either with closely wound turns, or with open or spaced turns, as desired. This may be done by disconnecting the extension shaft 22 from the cam shaft 12 at the coupling 21, for which condition, the device 71 will have no movement relatively to the carriage 24, and the lateral movement of said device 71 and said carriage is then determined by the ratio of the selected gearing and the pitch of the feed screw 15, which movement, if equal per rotation of the winding spindle 20, to the diameter of the winding wire, will wind a closely wound solenoid, and if greater than said wire diameter, will wind an open or space wound solenoid.

While I have shown my invention in the particular embodiment described, it will be understood that I do not limit myself thereto, as I may employ equivalents thereof known to the art at the time of the filing of this application, without departing from the scope of the appended claims.

Having thus described my invention, what I claim is:

1. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks.

2. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said relative rates of operation equally displacing successive winding cycles angularly on said spindle.

3. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said cam by each rotation effecting the winding of one bank of said coil, and said connecting devices for each of said cam rotations moving said carriage an amount substantially equal to the diameter of the winding wire.

4. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said cam surfaces having depressions and elevations effecting forward and downward movement of said wire guide to start the first turn of each of said winding cycles and also effecting upward and backward movement of said wire guide to start each of the remaining turns of said cycle.

5. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said wire guide comprising a first follower point engaging said end cam surface, a yoke holding said first follower point against said cam, a second follower point engaging and held against said side cam surface, a member secured to said second follower point and carried by said yoke for vertical movement relatively to said yoke, and a wire guiding device carried by said member.

6. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, devices connecting said spindle, said cam and said feed-screw for operation at relative rates effecting a cycle of winding the turns of each bank of said coil for movement of said carriage equal to the space on said spindle axially occupied by each of said banks, and manual means for disconnecting as desired said feed screw operating devices.

7. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, devices connecting said spindle, said cam and said feed-screw for operation at relative rates effecting a cycle of winding the turns of each bank of said coil for movement of said carriage equal to the space on said spindle axially occupied by each of said banks, said feed-screw operating devices including clutch mechanism, and a manually operable lever connected with said clutch mechanism to disconnect said feed screw operating devices as desired.

8. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said wire guide comprising a first follower point engaging said end cam surface, a yoke holding said first follower point against said cam, a second follower point engaging and held against said side cam surface, a member secured to said second follower point and carried by said yoke for vertical movement relatively to said yoke, a wire guiding device carried by said member, a lever carrying said first follower point, and a fulcrum member engaging said lever and said yoke and adjustable longitudinally of said lever to secure different amounts of movement of said yoke by said end cam surface.

9. In a machine for winding electrical coils, the combination of a winding spindle, a carriage movable longitudinally of said spindle, a feed-screw for moving said carriage, first changeable gearing connecting said spindle and said feed-screw for moving said carriage at a desired rate relatively to the rate of rotation of said spindle, a wire guide carried by said carriage, a rotary cam carried by said carriage and having cam surfaces engaging said wire guide to move the latter relatively to said carriage in winding bank-wound coils, and second changeable gearing including separable parts for rotating said cam at a desired rate relatively to the rate of rotation of said spindle and of said feed-screw, whereby with said cam in rotation bank-wound coils may be wound as determined by said cam and the ratios of said gearing, and with said separable parts separated solenoid coils may be wound either with closely wound turns or space-wound turns depending upon the ratio of said first gearing, said separable parts being relatively movable to operative and inoperative positions with the machine in assembled condition.

10. Wire guiding mechanism for winding bank-wound coils, consisting of the combination of a rotary cam having end and side cam surfaces, a follower point resting on each of said cam surfaces, and a wire guiding device connected with said follower points and moved laterally and vertically thereby.

11. Wire guiding mechanism for winding bank-wound coils, consisting of the combination of a rotary cam having end and side cam surfaces, a follower point resting on each of said cam surfaces, and a wire guiding device connected with said follower points and moved laterally and vertically thereby, said cam surfaces having depressions and elevations effecting laterally forward and vertically downward movement of said wire guiding device to start the first turn of each bank of the coil and also effecting vertically upward and laterally backward movement of said wire guiding device to start each of the remaining turns of said bank.

12. Wire guiding mechanism for winding bank-wound coils, consisting of the combination of a rotary cam having end and side cam surfaces, a first follower point resting against said end cam surface, a member movable laterally by said first follower point, a vertically movable rod carried by said member, a second follower point carried by said rod and resting against said side cam surface, and a wire guiding device carried by said rod.

13. Wire guiding mechanism for winding bank-wound coils, consisting of the combination of a rotary cam having end and side cam surfaces, a first follower point resting against said end cam surface, a member movable laterally by said first follower point, a vertically movable rod carried by said member, a second follower point carried by said rod and resting against said side cam surface, a wire guiding device carried by said rod, a lever carrying said first follower point, and a fulcrum member engaging said lever and said laterally movable member and adjustable longitudinally of said lever to secure different amounts of movement of said laterally movable member by said end cam surface.

14. In a machine for bank-winding electrical coils, the combination of a winding spindle, a carriage movable longitudinally of said spindle, a rotary cam carried by said carriage, a wire guide carried by said carriage and engaging said cam for movement thereby relatively to said carriage, said cam having end and side cam surfaces effecting lateral and vertical movements of said wire guide relatively to said spindle to wire guiding positions corresponding to the locations of the turns of a bank of a bank-wound coil, a feed-screw for moving said carriage, and devices connecting said spindle, said cam and said feed-screw for operation at relative rates effecting a cycle of winding the turns of each bank of said coil for movement of said carriage equal to the space on said spindle axially occupied by each of said banks, said wire guide comprising a first follower point engaging said end cam surface, a yoke holding said first follower point against said cam, a second follower point engaging and held against said side cam surface, a member secured to said second follower point and carried by said yoke for vertical movement relatively to said yoke, a wire guiding device carried by said member, and adjustable devices between said first follower point and said yoke for changing as desired the amount of movement of said yoke by said first follower point.

15. Wire guiding mechanism for winding bank-wound coils, consisting of the combination of a rotary cam having end and side cam surfaces, a first follower point resting against said end cam surface, a member movable laterally by said first follower point, a vertically movable rod carried by said member, a second follower point carried by said rod and resting against said side cam surface, a wire guiding device carried by said rod, and adjustable devices between said first follower point and said laterally movable member for changing as desired the amount of movement of said laterally movable member by said first follower point.

FREDERICK N. JACOB.

CERTIFICATE OF CORRECTION.

Patent No. 2,180,208.

November 14, 1939.

FREDERICK N. JACOB.

It is hereby certified that error appears in the printed specification of the above numbered patent requiring correction as follows: Page 2, second column, line 51, after the numeral "6" insert a comma; page 3, first column, line 32, for the word "same" read side; and that the said Letters Patent should be read with this correction therein that the same may conform to the record of the case in the Patent Office.

Signed and sealed this 19th day of December, A. D. 1939.

Henry Van Arsdale,
Acting Commissioner of Patents.

(Seal)